United States Patent
Ramkumar

(10) Patent No.: US 7,516,525 B2
(45) Date of Patent: Apr. 14, 2009

(54) PROCESS FOR MAKING CHEMICAL PROTECTIVE WIPES AND SUCH WIPES

(75) Inventor: Seshadri S. Ramkumar, Lubbock, TX (US)

(73) Assignee: Texas Tech University, Lubbock, TX (US)

( * ) Notice: Subject to any disclaimer, the term of this patent is extended or adjusted under 35 U.S.C. 154(b) by 479 days.

(21) Appl. No.: 11/157,124

(22) Filed: Jun. 20, 2005

(65) Prior Publication Data

US 2005/0268443 A1 Dec. 8, 2005

Related U.S. Application Data

(63) Continuation-in-part of application No. 10/874,793, filed on Jun. 23, 2004, which is a continuation-in-part of application No. 10/235,303, filed on Sep. 5, 2002, now abandoned.

(60) Provisional application No. 60/388,536, filed on Jun. 13, 2002.

(51) Int. Cl.
D04H 5/02 (2006.01)

(52) U.S. Cl. .................. 28/107; 28/158

(58) Field of Classification Search ........... 28/107, 28/111, 112, 113, 114, 108, 109, 110, 158, 28/103, 115, 140; 442/387, 388, 402, 403, 442/383; 156/148

See application file for complete search history.

(56) References Cited

U.S. PATENT DOCUMENTS

| 3,641,638 A | 2/1972 | Liable |
| 3,719,545 A | 3/1973 | Lawler |
| 3,935,046 A * | 1/1976 | Kiernan et al. ............... 156/148 |
| 3,971,072 A | 7/1976 | Armelino |
| 3,975,565 A * | 8/1976 | Kendall ........................ 28/107 |
| 4,181,513 A * | 1/1980 | Fukuda et al. ................. 96/153 |
| 4,272,851 A | 6/1981 | Goldstein |
| 4,416,936 A * | 11/1983 | Erickson et al. ............. 442/405 |
| 4,522,876 A * | 6/1985 | Hiers ......................... 442/388 |
| 4,610,905 A | 9/1986 | Von Blücher et al. |
| 4,726,978 A | 2/1988 | Simpson |
| 4,772,510 A | 9/1988 | McClure |
| 4,833,010 A | 5/1989 | Langley |

(Continued)

FOREIGN PATENT DOCUMENTS

| WO | WO9308024 | 4/1993 |
| WO | WO9421450 | 9/1994 |

OTHER PUBLICATIONS

Buer, et al., "Electrospinning and Properties of Some Nanofibers", Textile Research Journal, (Apr. 2001), 71(4):323-328.
Dunn (Associate Editor—Nonwovens/Technical Textiles Section), "Texas Tech University Buys Fehrer Needle-Punch Loom", TextileIndustries.com NW/TT (Aug. 2001), p. 24.

(Continued)

Primary Examiner—Amy B Vanatta
(74) Attorney, Agent, or Firm—Chainey P. Singleton; Edwin S. Flores; Chalker Flores, LLP

(57) ABSTRACT

A process for making chemical protective wipes is disclosed. A top layer is fully needlepunched (102). A bottom layer is fully needlepunched (104). Then, an adsorption layer is sandwiched between the top layer and the bottom layer (106). Then, the sandwich is fully needlepunched (108).

18 Claims, 13 Drawing Sheets

U.S. PATENT DOCUMENTS

| | | | | |
|---|---|---|---|---|
| 4,855,178 | A | | 8/1989 | Langley |
| 4,948,649 | A | * | 8/1990 | Hiers et al. ............ 428/77 |
| 5,035,941 | A | | 7/1991 | Blackburn |
| 5,283,113 | A | * | 2/1994 | Nishimura et al. ............ 28/107 |
| 5,316,820 | A | | 5/1994 | Harpell et al. |
| 5,327,811 | A | | 7/1994 | Price et al. |
| 5,343,796 | A | | 9/1994 | Cordova et al. |
| 5,346,565 | A | * | 9/1994 | White ............ 28/112 |
| 5,403,367 | A | | 4/1995 | De Villiers et al. |
| 5,536,553 | A | | 7/1996 | Coppage et al. |
| 5,560,971 | A | | 10/1996 | Emery |
| 5,581,857 | A | | 12/1996 | Sheehan et al. |
| 5,591,933 | A | | 1/1997 | Li et al. |
| 5,733,826 | A | * | 3/1998 | Groitzsch ............ 28/107 |
| 5,790,987 | A | | 8/1998 | Sesselmann |
| 5,800,749 | A | | 9/1998 | Lewit et al. |
| 5,824,940 | A | | 10/1998 | Chediak et al. |
| 5,874,373 | A | | 2/1999 | Pryne et al. |
| 5,985,442 | A | * | 11/1999 | Nagaya ............ 442/409 |
| 6,003,424 | A | | 12/1999 | Cordova et al. |
| 6,127,291 | A | | 10/2000 | Coppage et al. |
| 6,276,254 | B1 | | 8/2001 | Cordova et al. |
| 6,281,149 | B1 | | 8/2001 | Hussein et al. |
| 6,314,627 | B1 | * | 11/2001 | Ngai ............ 28/104 |
| 6,321,915 | B1 | | 11/2001 | Wilson et al. |
| 6,397,672 | B1 | | 6/2002 | Ramkumar |
| 6,408,733 | B1 | | 6/2002 | Perciballi |
| 6,562,435 | B1 | | 5/2003 | Brilhart et al. |
| 6,696,374 | B2 | | 2/2004 | Bridgeman et al. |
| 2001/0015222 | A1 | | 8/2001 | Lewit et al. |
| 2002/0069444 | A1 | | 6/2002 | Graham et al. |
| 2002/0168911 | A1 | * | 11/2002 | Tonner ............ 442/405 |
| 2003/0022583 | A1 | | 1/2003 | Thomas et al. |
| 2003/0049187 | A1 | | 3/2003 | Kaiser |

OTHER PUBLICATIONS

Grafe, et al., "Nanofibers in Filtration Applications in Transportation" presented at Filbration 2001 International Conference and Exposition of the INDA, Chicago, IL, Dec. 3-5, 2001, 15 pages.

Hayes, "Activated Carbon Fiber Textiles for Filtration and Separation", American Kynol, Inc. (www.kynol.com) 18 pages, Oct. 24, 2003.

Hayes, "Activated Carbon Fibers and Textiles: Properties and Applications" (according to Seshadri S. Ramkumar, the source of this article is American Kynol, Inc.), 20 pages, Jun. 1994.

Hayes, "Nanostructure of Activated Carbon Fibers and Kinetics of Adsorption/Desorption", Paper #43053 (according to Seshadri S. Ramkumar, the source of this article is American Kynol, Inc.), 22 pages, Oct. 24, 2003.

Lin, et al., "The Preparation and Properties of Activated Carbon Fibers Derived from Phenolic Precursor", Applied Polymer Symposium No. 21 (1973), 143-152.

Macdiarmid, et al., "Electrostatically-generated nanofibers of electronic polymers", Elsevier Science, Synthetic Metals (2001), 119:27-30.

Roedel, et al., Surface and Mechanical Property Measurements of H1 Technology Needle-Punched Nonwovens, Textile Research Journal (May 2003), 73(5):381-385.

Ramkumar, et al., "Study of Needle Penetration Speeds on Frictional Properties of Nonwoven Webs: A New Approach", Applied Polymer Science (2003), 89:3626-3631.

Ramkumar, "Developments in nonwovens technology: current scenario", ATA Journal (Jun./Jul. 2001), p. 59.

Ramkumar, "Development of Nonwoven Protective Clothing: A New Initiative", 81st World Conference of the Textile Institute (Apr. 2001), Melbourne, Australia, pp. 1-5 and presentation of same.

Thariath, "Indian American Develops Device to Analyze Fabrics", India Abroad Newspaper (Feb. 4-8, 2002), 1 page.

"Activated Carbon Fabrics—Manufacture and Characteristics" (according to Seshadri S. Ramkumar, the source of this article is American Kynol, Inc. (www.kynol.com)) 3 pates, Oct. 24, 2003.

"Batson Sale: Texas Tech to be first in U.S. to house Fehrer needle loom", Southern Textile News, Education Section (May 28, 2001), Greenville, SC, p. 9.

"Improved Filters, Absorbents, Scrubbers, and Membranes for Chemical Decontamination and Restoration of Function", Making the Nation Safer, National Research Council of the National Academies, Footnotes 6 and 7, Oct. 24, 2003.

"Nonwoven Processing Equipment at Texas Tech," Researcher's Toolbox Section, International Nonwoven Journal (Summer 2001), 10(2):5.

"Novoloid Fibers", Encyclopedia of Chemical Technology, 3rd Edition, Vo. 6, pp. 125-136, John Wiley and Sons, New York, NY, Oct. 24, 2003.

"Texas Tech Purchases Batson Loom", The Cotton Gin and Oil Mill Press (Jun. 16, 2001), p. 8.

"Texas Tech Receives New Non Woven Equipment", Batson Yarn and Fabrics Machinery Group, Inc., Immediate Release, unknown date, 1 page, Oct. 24, 2003.

"Texas Tech receives new non-woven equipment", Colourage (Apr. 2001), p. 94.

"Texas Tech Research Officials Visit Post Fiber Tech Facility", The Post Dispatch (Jan. 31, 2002), front page (photocopied onto 3 sheets 8½×11).

"Texas Tech Uses New Nonwoven Loom", AATCC Review (Aug. 2001), p. 4.

"American Kynol, Inc." Home Page, (http://www.kynol.com/index.html) accessed Aug. 27, 2003, 3 pages.

Batson Yarn and Fabrics, "Texas Tech Receives New Non Woven Equipment", p. 1, accessed May 16, 2001, http://www.textileweb.com/content/news/article.asp?docid={96F9663A-4977-11D5-A772-00 . . . .

"Company Profile and History" accessed Aug. 27, 2003, 3 pages (http://www.kynol.com/NewFiles/about%20kynol.html).

Internet Archive Wayback Machine version of "American Kynol Inc. Home Page", (http://web.archive.org/web/0020608234033/http://www.kynol.com/index.html), last accessed on Aug. 27, 2003, 3 pages.

"Novoloid Fibers" (http://plastics.about.com/library/glossary/n/bldef-n3659.htm), last accessed on Aug. 27, 2003, 3 pages.

Online Exclusive, "Texas Tech Project Uses Fehrer Needlepunch Loom," 1 page, accessed May 17, 2001, Textile World, http://industryclick.com/magnewsarticle.asp?newsarticleid=201348&magazineid=137& . . . .

"Kynol™ Fibers" accessed Aug. 27, 2003, 9 pages (http://www.kynol.com/NewFiles/kynol%20fibers%20with%20pics.html).

"Applications" accessed Aug. 27, 2003, 6 pages (http://www.kynol.com/NewFiles/applications%20with%20pics.html).

"Kynol™ Carbon Fiber" accessed Aug. 27, 2003, 2 pages (http://www.kynol.com/NewFiles/carbon%20fiber%20with%20pics.html).

"Kynol™ Activated Carbon Fiber" accessed Aug. 27, 2003, 3 pages (http://www.kynol.com/NewFiles/activated%20carbon%20w%20pics.html).

"Product Specifications" accessed Aug. 27, 2003, 1 pages (http://www.kynol.com/NewFiles/Product%20Spec%Index.html).

"Standard Specifications of Kynol Products" accessed Aug. 27, 2003, 4 pages (http://www.kynol.com/NewFiles/kynol%20specifications.html).

"Standard Specifications of Kynol Carbon Fiber Products" accessed Aug. 27, 2003, 2 pages (http://www.kynol.com/NewFiles/carbon%20fiber%20spec.html).

"Standard Specifications of Kynol Activated Carbon Fiber Products" accessed Aug. 27, 2003, 2 pages (http://www.kynol.com/NewFiles/activated%20carbon%20spec.html).

Internet Archive Wayback Machine, 1 page (http://web.archive.org/web/*/http://www.kynol.com) last accessed on Aug. 27, 2003.

* cited by examiner

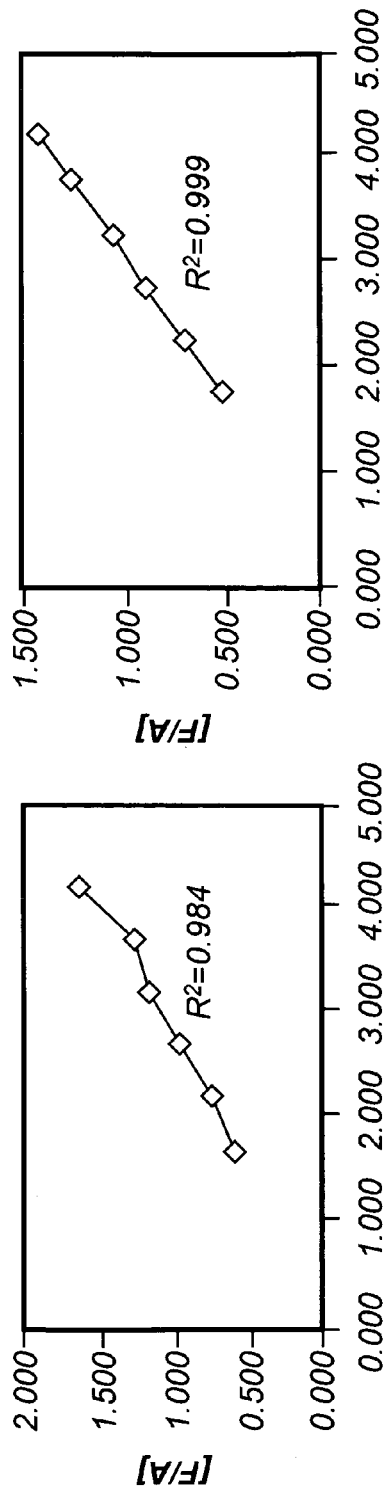
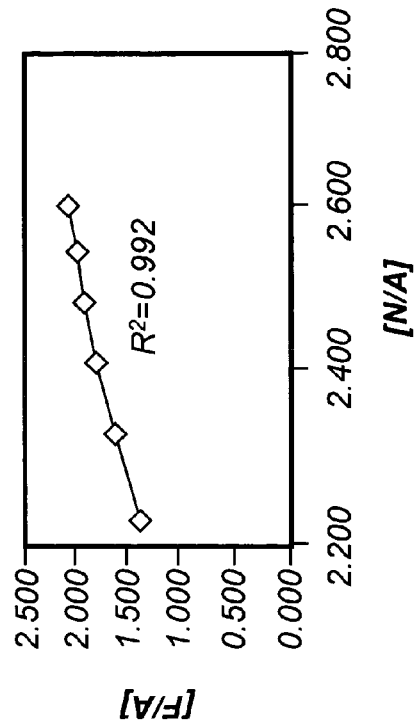
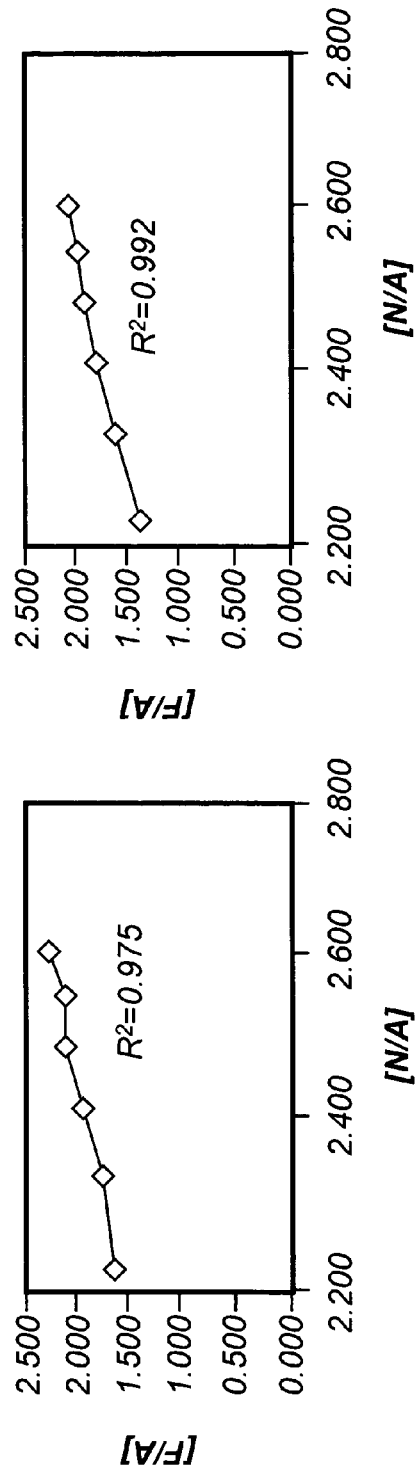
FIG. 15A-1, FIG. 15A-2, FIG. 15B-1, FIG. 15B-2

PROCESS FOR MAKING CHEMICAL PROTECTIVE WIPES AND SUCH WIPES

CROSS-REFERENCE TO RELATED PATENT APPLICATIONS

This patent application is a continuation-in-part of copending U.S. patent application Ser. No. 10/874,793, entitled, "Chemical protective composite substrate and method of producing same," and filed Jun. 23, 2004, now pending, which is a continuation-in-part of U.S. patent application Ser. No. 10/235,303, entitled, "Chemical protective composite substrate and method of producing same," and filed Sep. 5, 2002, now abandoned; this patent application claims the benefit of U.S. Provisional Patent Application No. 60/388,536, entitled, "Method of Producing Chemical Protective Composite Substrate," and filed Jun. 13, 2002, based on like claims by U.S. patent applications Ser. Nos. 10/874,793 and 10/235,303.

STATEMENT REGARDING FEDERALLY SPONSORED RESEARCH AND DEVELOPMENT

The invention which is the subject of this disclosure was made in part with Government support under Grant Numbers DAAD13-00-C-0051, DAAD13-01-C-0066-AE, DAAD13-02-C-0075, and W911SR-04-C-0048 awarded by the United States Army, Department of Defense. The Government may have certain rights in the invention.

TECHNICAL FIELD OF THE DISCLOSURE

This disclosure pertains to processes for making chemical protective wipes and such wipes.

BACKGROUND OF THE DISCLOSURE

This disclosure provides such a process and wipe. These and other advantages, as well as additional inventive features, will be apparent from the present disclosure.

In particular situations people may encounter harmful concentrations of hazardous chemicals. In such situations, it is necessary to wear chemical protective garments of special composition and construction. These protective garments are necessary for providing an effective barrier between the wearer and the chemicals encountered. Protective clothing of many types are well known for many and varied uses including protection from fire, chemical liquids and vapors and other harmful substances. Such clothing is often seen in suits for industrial workers, firemen, hazardous waste workers, chemical workers, race car drivers, airplane pilots and military personnel. Garments include not only complete hermetic suits, but also individual components such as trousers, jackets, gloves, boots, hats, head coverings, masks, etc.

Regulations restricting exposure to hazardous environments of various kinds, such as those contained in the Occupational Safety and Health Act, (OSHA) make it increasingly necessary to have better and more effective kinds of protective clothing.

Protective garments include woven and non-woven fabrics for disposable use. These garments are generally formed from various polymeric films or laminated plastic materials which are intrinsically resistant to dust or liquid penetration and in some cases impervious to chemical vapor penetration. The fabrics are generally spunbonded, meltspun or of non-woven thermoplastic material.

The garments presently available are almost invariably of thick construction and heavy in weight, and are often fabricated at least in part from materials impermeable to water or water vapor, such as natural and synthetic rubbers and elastomers, chlorinated rubbers, etc.

Strong, lightweight chemical protective garment materials made from laminates of different materials are known. U.S. Pat. No. 4,272,851 (Goldstein) describes a film of polyethylene that may be laminated to nonwoven chemical protective apparel. U.S. Pat. No. 4,772,510 (McClure) describes a chemical barrier film laminated to a nonwoven substrate using an adhesive. Other laminates having multiple barrier layers are described in U.S. Pat. No. 4,855,178 (Langley); U.S. Pat. No. 4,833,010 (Langley) and U.S. Pat. No. 5,035,941 (Blackburn).

Often, each layer of a chemical protective garment material is chosen to impart a specific property to the composite fabric. Some layers provide strength while other layers may be chosen to provide permeation resistance against specific classes of chemicals. Additional layers add weight and stiffness. However, stiff garments are difficult to assemble and reduce the wearer's mobility.

Clearly, what is needed is a lightweight, chemical protective garment material, having a limited number of distinct layers, which can be assembled into a protective garment. In addition, the applicant recognizes the need for simplified processes to make such chemical protective garment materials.

BRIEF DESCRIPTION OF THE DRAWINGS

For a more complete understanding of the present disclosure, and the advantages thereof, reference is now made to the following brief descriptions taken in conjunction with the accompanying drawings, in which like reference numerals indicate like features.

FIGS. 15A and 15B show charts of a friction force versus normal load relationship curves of the composite substrate of the preferred embodiment, in a cross-direction and machine-direction, respectively;

DETAILED DESCRIPTION

This disclosure provides a process for making chemical protective wipes, the process comprising (a) fully needlepunching a top layer, (b) fully needlepunching a bottom layer, (c) then, sandwiching an adsorption layer between the top layer and a bottom layer, and (d) then, fully needlepunching the sandwich. Preferably, the top and bottom layers are individually and separately needlepunched. Also, the needlepunching can be single-, double-, or multiple-needlepunching, and be from above, below, or both.

The term "full needlepunching" means needlepunching with a stitch density of at least twice the stitch density typically seen with pre-needlepunching. Pre-needlepunching, also known as pre-needling, is performed at a stitch density minimally required to handle a work piece for subsequent processing. Commonly, pre-needlepunching is performed at a stitch density of 50-75 punches per square centimeter. Accordingly, full needlepunching would ordinarily be performed at a stitch density of at least 100 punches per square centimeter.

The numerous innovative teachings of the present application will be described with particular reference to several embodiments (by way of example, and not of limitation).

Figure 1:
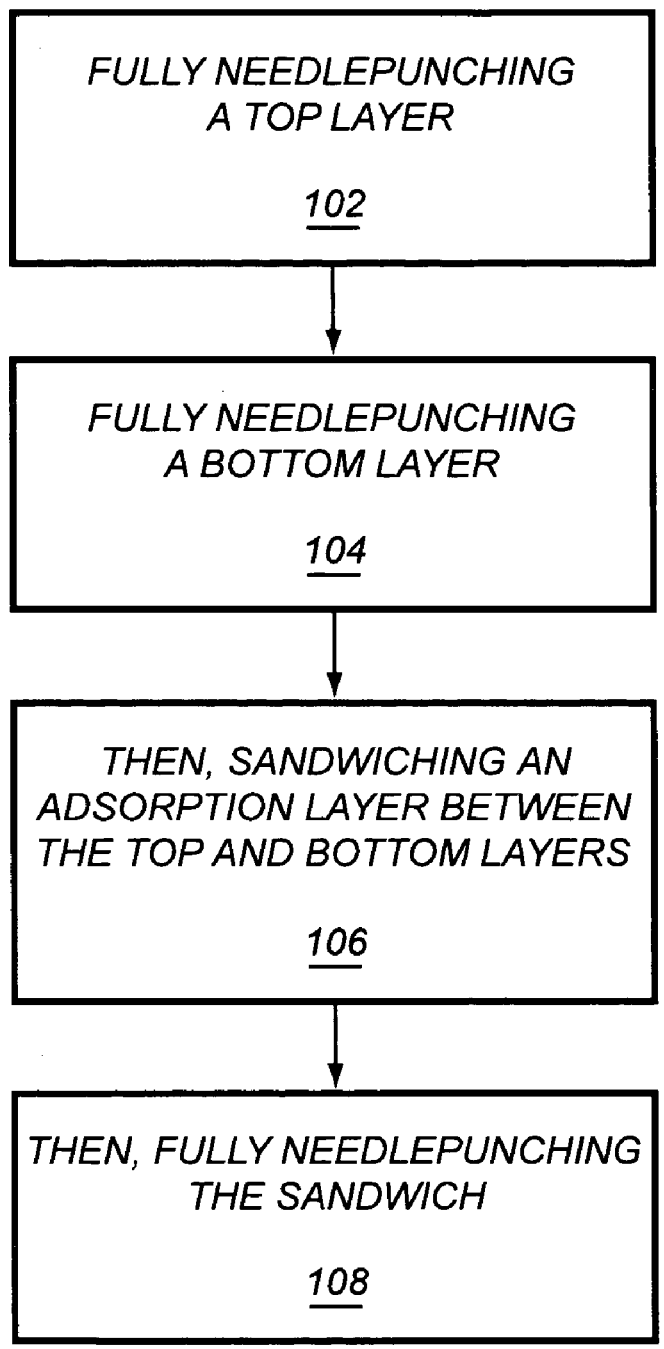
FIG. 1 is a flow diagram depicting a process for making chemical protective wipes, in accordance with an embodiment of the present invention.

Some variations of the invention are shown in FIGS. 1-8. Turning to FIG. 1, a process for making chemical protective wipes is disclosed. A top layer is fully needlepunched 102. A bottom layer is fully needlepunched 104. Then, an adsorption layer is sandwiched between the top layer and the bottom layer 106. Then, the sandwich is fully needlepunched 108.

Figure 2:
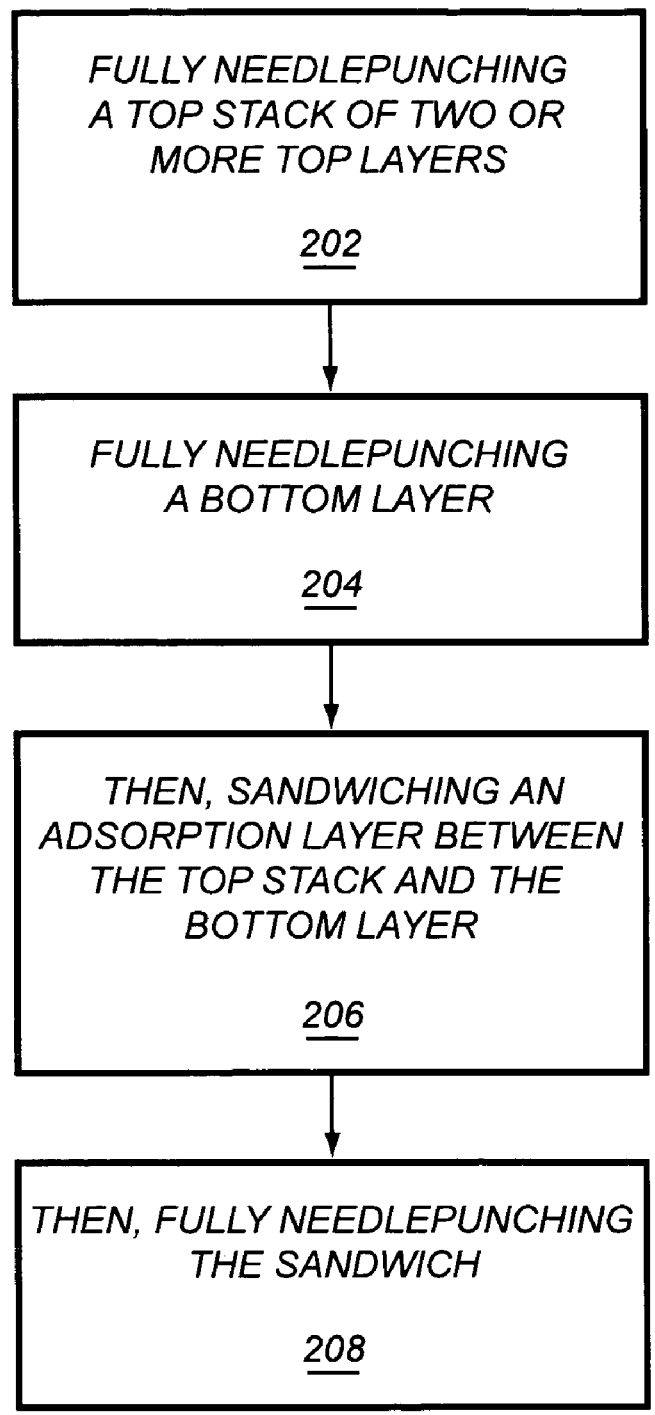
FIG. 2 is another flow diagram depicting a process for making chemical protective wipes, in accordance with another embodiment of the present invention.

Turning to FIG. 2, another process for making chemical protective wipes is disclosed. A stack of two or more top layers is fully needlepunched 202. A bottom layer is fully needlepunched 204. Then, an adsorption layer is sandwiched between the top stack and the bottom layer 206. Then, the sandwich is fully needlepunched 208.

Figure 3:
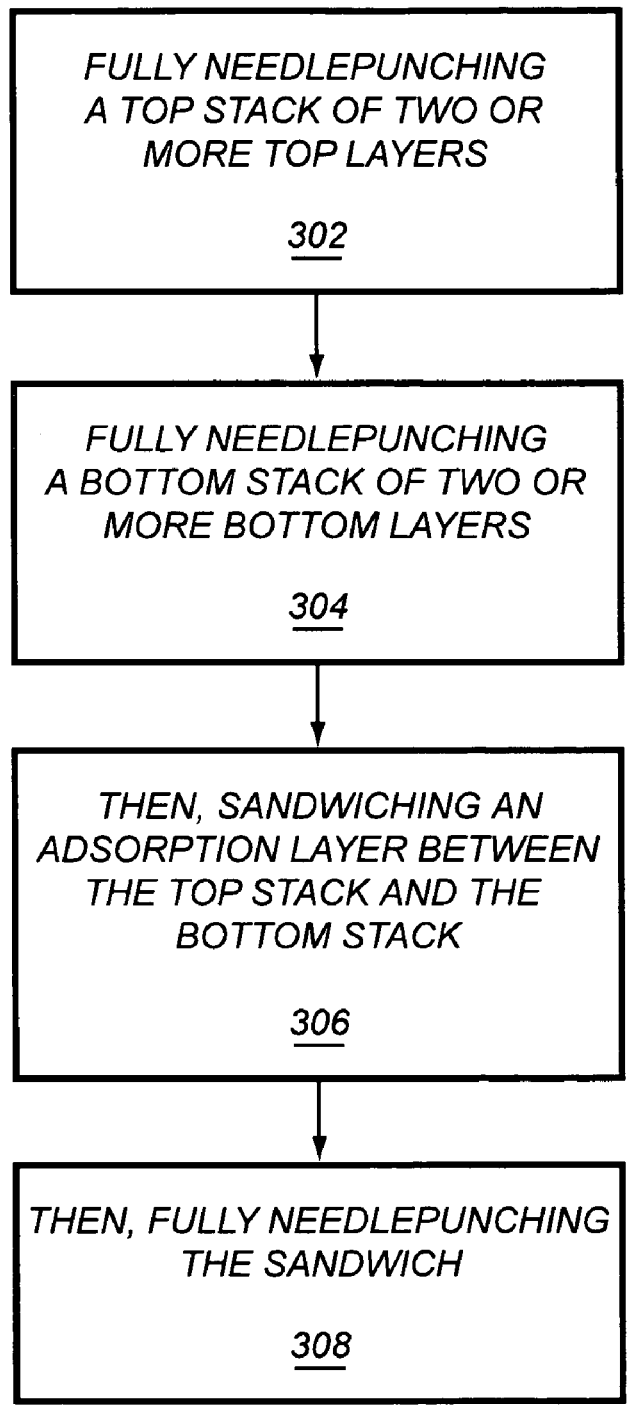
FIG. 3 is another flow diagram depicting a process for making chemical protective wipes, in accordance with another embodiment of the present invention.

Turning to FIG. 3, another process for making chemical protective wipes is disclosed. A top stack of two or more top layers is fully needlepunched 302. A bottom stack of two or more bottom layers is fully needlepunched 304. Then, an adsorption layer is sandwiched between the top stack and the bottom stack 306. Then, the sandwich is fully needlepunched 308.

Figure 4:
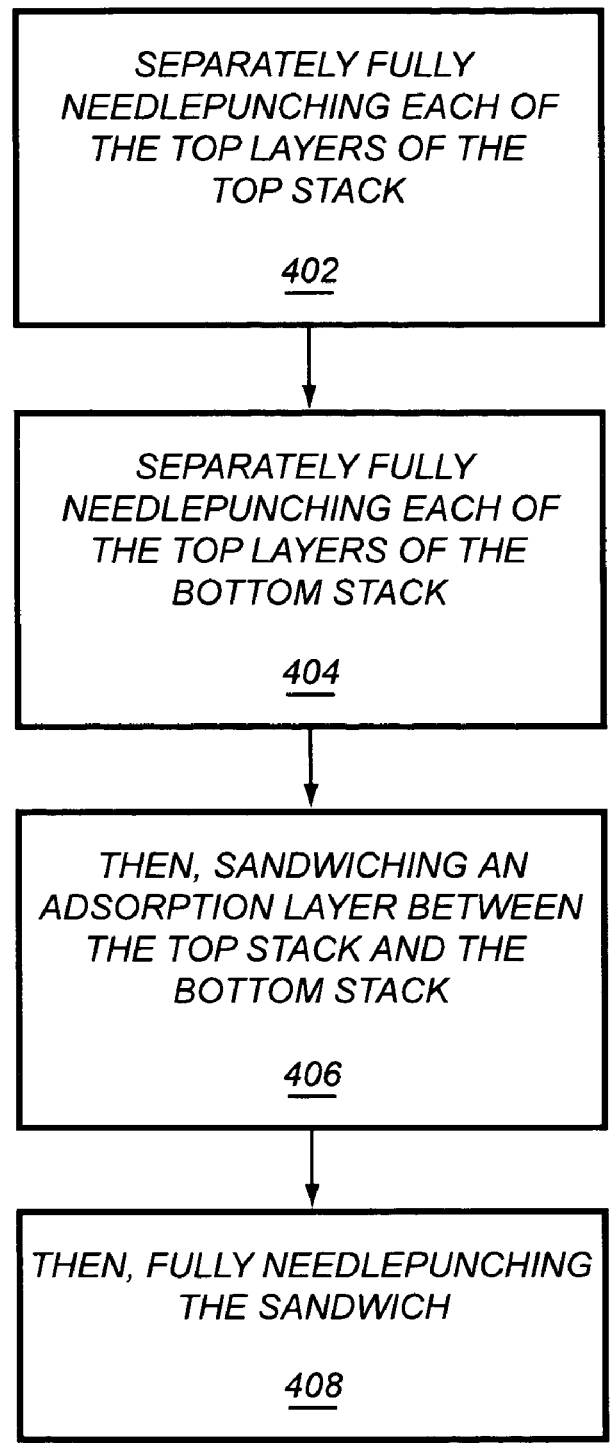
FIG. 4 is another flow diagram depicting a process for making chemical protective wipes, in accordance with another embodiment of the present invention.

Turning to FIG. 4, another process for making chemical protective wipes is disclosed. Each of a top stack of two or more top layers is separately fully needlepunched 402. Each of a bottom stack of two or more bottom layers is separately fully needlepunched 404. Then, an adsorption layer is sandwiched between the top stack and the bottom stack 406. Then, the sandwich is fully needlepunched 408.

Figure 5:
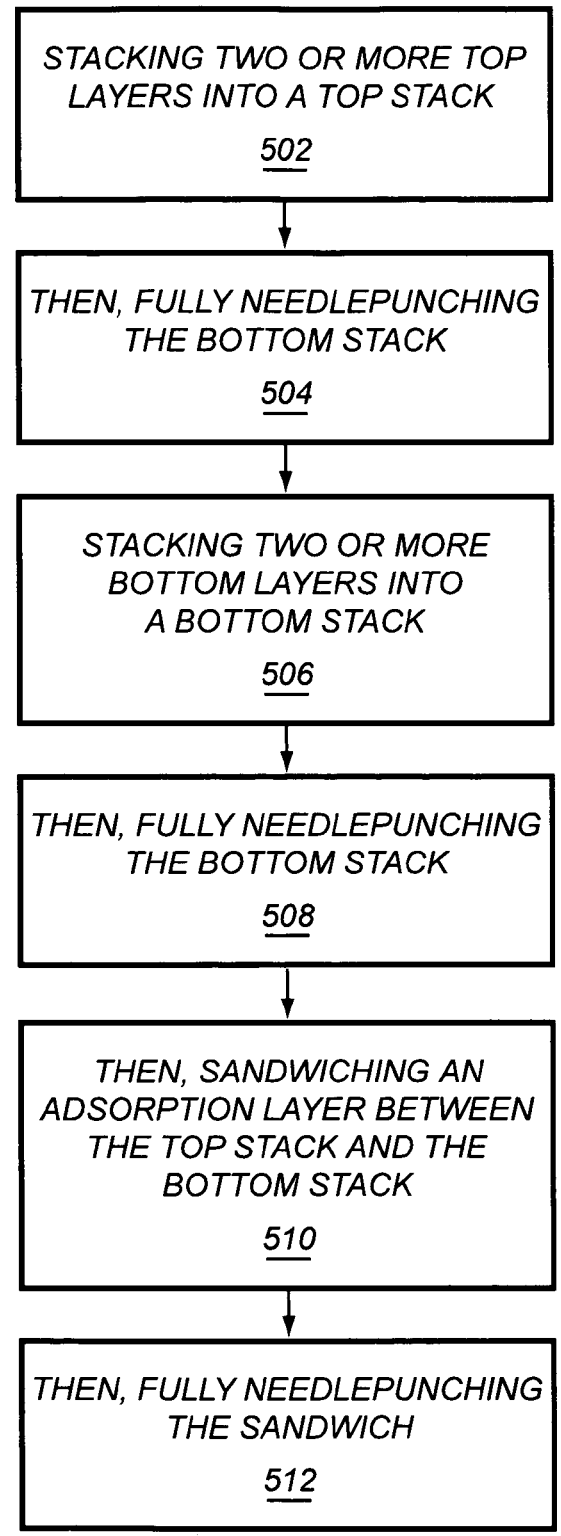
FIG. 5 is another flow diagram depicting a process for making chemical protective wipes, in accordance with another embodiment of the present invention.

Turning to FIG. 5, another process for making chemical protective wipes is disclosed. Two or more top layers is stacked into a top stack 502. Then, the top stack is fully needlepunched 504. Two or more bottom layers are stacked into a bottom stack 506. Then, the bottom stack is fully needlepunched 508. Then, an adsorption layer is sandwiched between the top stack and the bottom stack 510. Then, the sandwich is fully needlepunched 512.

Figure 6:
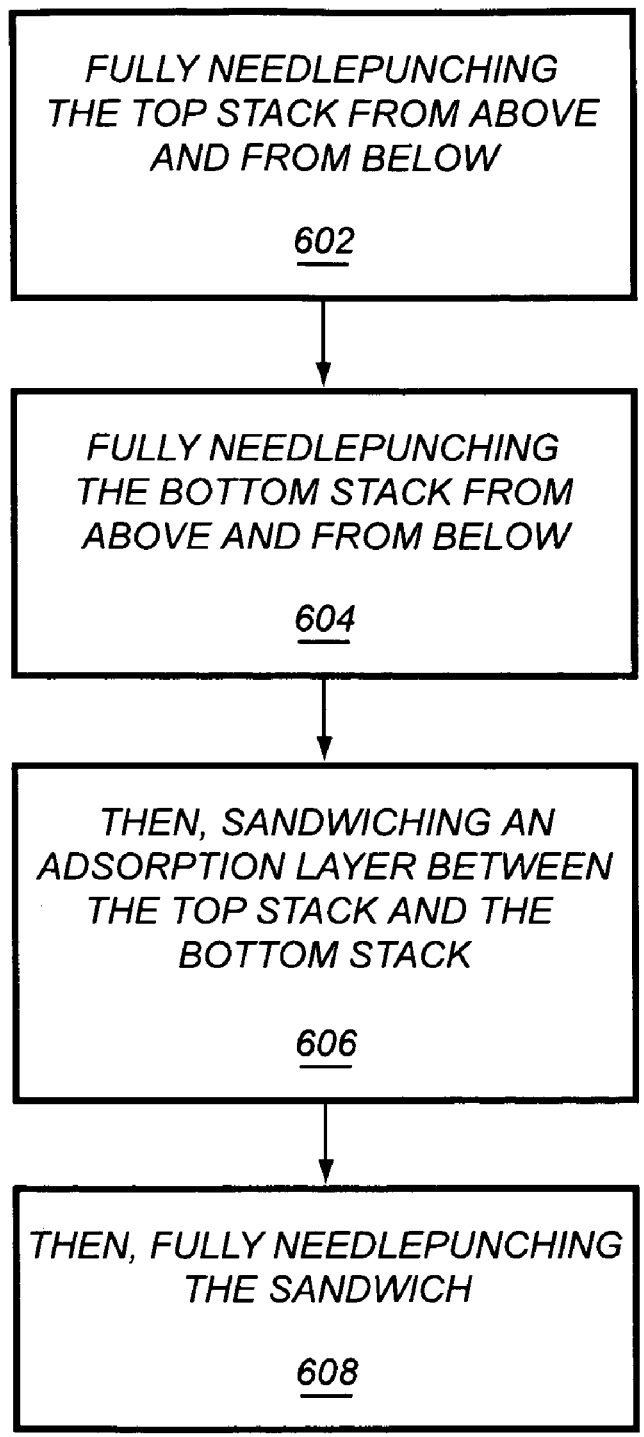
FIG. 6 is another flow diagram depicting a process for making chemical protective wipes, in accordance with another embodiment of the present invention.

Turning to FIG. 6, another process for making chemical protective wipes is disclosed. A top stack of two or more top layers is fully needlepunched from above and from below 602. A bottom stack of two or more bottom layers is fully needlepunched from above and from below 604. Then, an adsorption layer is sandwiched between the top stack and the bottom stack 606. Then, the sandwich is fully needlepunched 608.

Figure 7:
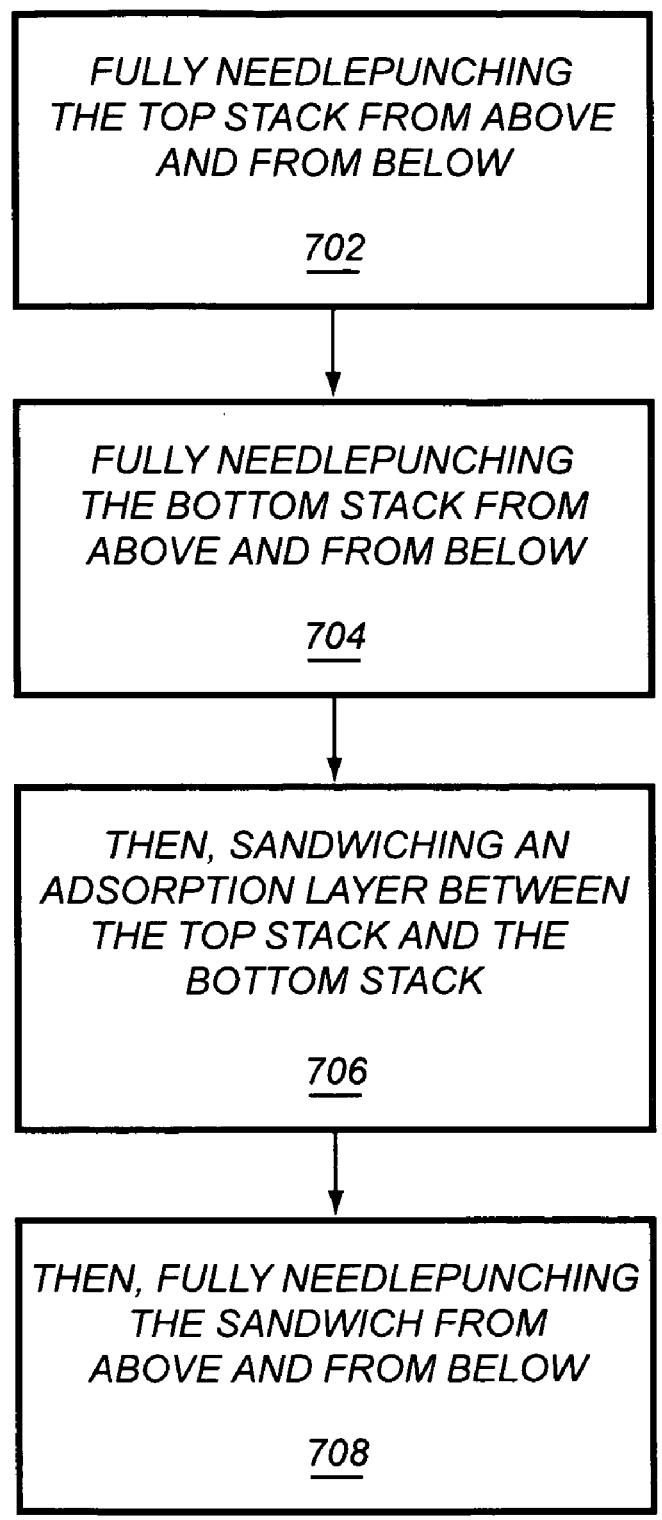
FIG. 7 is another flow diagram depicting a process for making chemical protective wipes, in accordance with another embodiment of the present invention.

Turning to FIG. 7, another process for making chemical protective wipes is disclosed. A top stack of two or more top layers is fully needlepunched from above and from below 702. A bottom stack of two or more bottom layers is fully needlepunched from above and from below 704. Then, an adsorption layer is sandwiched between the top stack and the bottom stack 706. Then, the sandwich is fully needlepunched from above and from below 708.

Figure 8:
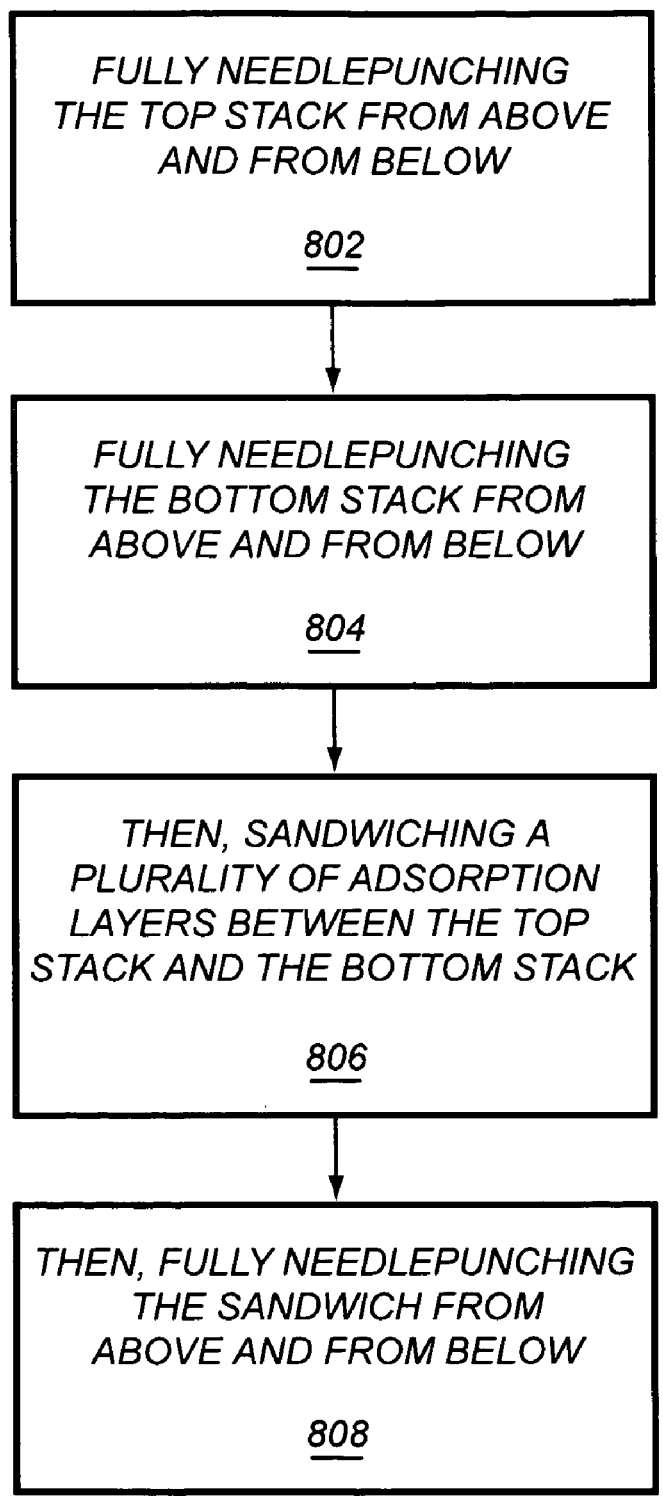
FIG. 8 is another flow diagram depicting a process for making chemical protective wipes, in accordance with another embodiment of the present invention.

Turning to FIG. 8, another process for making chemical protective wipes is disclosed. A top stack of two or more top layers is fully needlepunched from above and from below 802. A bottom stack of two or more bottom layers is fully needlepunched from above and from below 804. Then, a plurality of adsorption layers is sandwiched between the top stack and the bottom stack 806. Then, the sandwich is fully needlepunched from above and from below 808.

Figure 9:
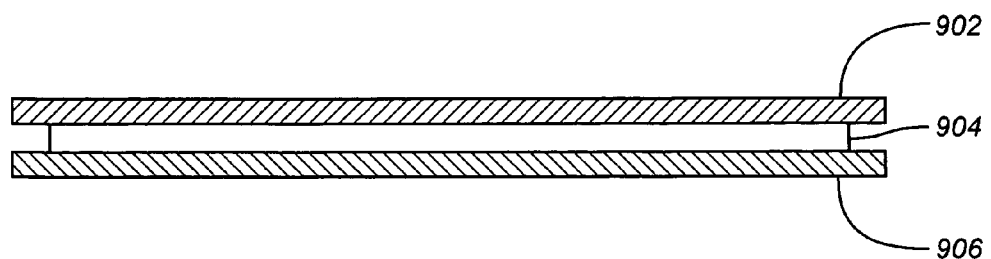
FIG. 9 depicts a three-layered wipe according to the preferred embodiment, and produced by a method according to the preferred embodiment.

Turning to FIG. 9, a side view of a chemical protective wipe is depicted. A top layer 902, adsorption layer 904, and bottom layer 906 form a sandwich.

Figure 10:
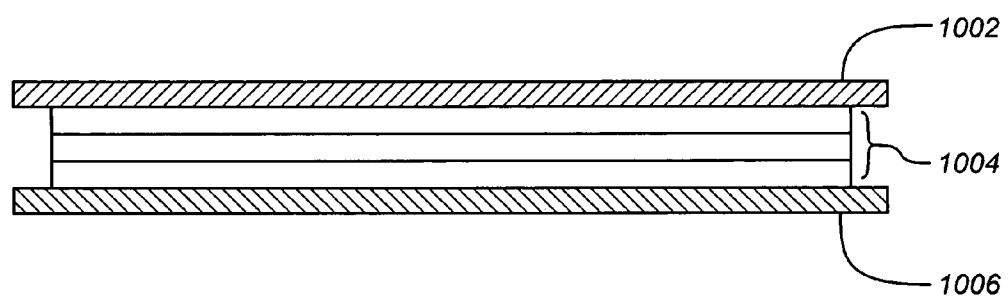
FIG. 10 depicts a multi-layered wipe according to the preferred embodiment having multiple adsorption layers, and produced by a method according to the preferred embodiment.

Turning to FIG. 10, a side view of another chemical protective wipe is depicted. A top layer 1002, a plurality of adsorption layers 1004, and a bottom layer 1006 form a sandwich.

Figure 11:
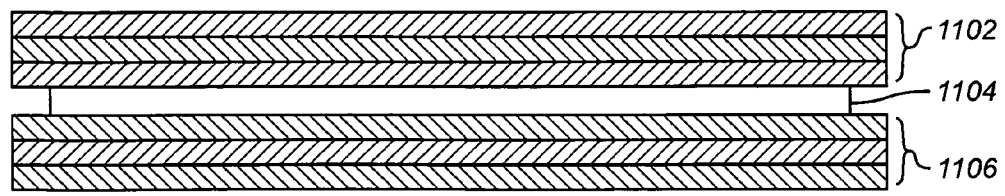
FIG. 11 depicts a multi-layered wipe according to the preferred embodiment having multiple top layers, and produced by a method according to the preferred embodiment.

Turning to FIG. 11, a side view of another chemical protective wipe is depicted. A plurality of top layers 1102, an adsorption layer 1104, and a plurality of bottom layers 1106 form a sandwich.

The top and bottom layers (also called nonwoven mats), can be composed of any type of natural or synthetic fiber and such fibers may be antimicrobial or biocidal. Preferably, the top and bottom layers are composed of polyester, silk, polypropylene, cotton, or wool. More preferably, the top and bottom layers are composed of apparel grade polyester.

The top and bottom layers can include fibers of any length. Preferably, the top and bottom layers include fibers having length of about 1-3 inches. More preferably, the top and bottom layers include fibers having length of about 1.5 inches.

The top and bottom layers can include fibers having any denier. Preferably, the top and bottom layers include fibers having denier of about 1-3. More preferably, the top and bottom layers include fibers having denier of about 1.5.

The adsorption layer can be composed of any adsorptive material. Preferably, the adsorption layer is composed of activated carbon, meltblown web, filter paper, or adsorbent paper. More preferably, the adsorption layer is composed of activated carbon.

Needlepunching is performed in multiple steps of the disclosed embodiments. Any sort of needlepunching is acceptable. Preferably, the needlepunching machine is H1 technology, hyperpunch, or flatbed. More preferably, the machine is H1 technology. Preferably, the needlepunching is straight or oblique. More preferably, the needlepunching is oblique.

The process of the present disclosure includes sandwiching one or more adsorption layers between at least one top layer and a bottom layer. Where more than one adsorption layer is used, several benefits can be realized:
 a. where more total adsorbent material is used, increased adsorbency;
 b. increased tear and tensile strength;
 c. increased convenience where a single-surface-area adsorbent layer piece is stocked for assembly into a composite of multiple adsorbent layers having a total adsorbent composite thickness equal to a multiple of the thickness of the stocked adsorbent layer pieces (depending on context, the term "adsorbent layer" refers to one such piece or a composite of such pieces);
 d. increased control of distribution of adsorbent material (for example, in some embodiments, it is preferable that the adsorbent material be evenly distributed, which can be facilitated by utilization of several thin adsorbent layer pieces).

The top layer(s), the bottom layer(s), and the entire sandwich can be needlepunched at any density(ies). The top layer (s), the bottom layer(s), and the entire sandwich can be, but need not be, needlepunched at the same or about the same needling density. Preferably, needlepunching is performed at about 50-1500 strokes per minute. More preferably, needlepunching is performed at about 500-750 strokes per minute.

The top layer(s), the bottom layer(s), and the entire sandwich can be needlepunched from above, from below, or both. Preferably, the top layer(s), the bottom layer(s), and the entire sandwich are needlepunched from above and from below.

The top and bottom layers can have any weight. Preferably, the top and bottom layers each weigh about 10-500 grams per square meter. More preferably, the top and bottom layers each weigh about 43.8 grams per square meter.

Needlepunching increases the interlocking fiber-to-fiber integration, as measured by improved tear and tensile strength. Such interlocking fiber-to-fiber integration can be increased by several known methods, including:
 a. more needling density;
 b. needling from above and from below;
 c. adding more top layers; and
 d. adding more adsorption layers.

In one embodiment, the nonwoven mats are made from apparel grade polyester fibers of 1.5" length and 1.5 denier, using H1 technology needlepunching machinery. A woven activated carbon cloth is sandwiched between two nonwoven substrates. The nonwoven substrates are double punched at a speed of 800 strokes/min. The three layers are fed to the conveyor belt that feeds the needleloom. The three-layer sandwich passes through the needling zone and gets compacted into a composite substrate. The three layers are needlepunched at 800 strokes/min resulting in a needle composite structure that has: a top or prefilter nonwoven layer; a middle or adsorbent layer and a bottom or base nonwoven layer.

According to various embodiments of the present invention, the adsorbent layer can be woven, nanowebs, fibers or any form that is suitable to be fed through the conveyor of the needleloom.

The claimed composite offers protection against toxic chemicals due to the activated carbon layer and provides necessary comfort and breathability to the wearers.

In the preferred process, regular apparel grade polyester fibers of 1.5" length and 1.5 denier are used as the pre-filter and base substrates. Preferably, Dacron® fibers are used; Dacron® is a long-chain polyester made from ethylene glycol and terephthalic acid and manufactured by DuPont. The polyester fibers are passed through a double cylinder card and a crosslapper machine before being fed into an Hi technology needleloom machine. The speed of punching is preferably 800 needle strokes/min, and the weights of the pre-filter and base substrates are 43.8 g/m$^2$.

The principle of the Hi technology used in the preferred embodiment is the special properties that can be obtained by oblique angled needle penetration. This unique capability is achieved by means of an asymmetrically curved needling zone, accompanied by a straight needle movement. Because of this design, some fibers are punched or inserted at an angle rather than in a vertical direction. The advantages of this technology include the following:
 a. The longer needle path results in better fiber orientation and fiber entanglement than the conventional needle machine.
 b. Superior web properties can be obtained with fewer needle penetrations.
 c. It greatly enhances the construction of composite and hybrid products.
 d. It delivers increased productivity versus conventional needlepunch looms.

The H1 processing line includes units for complete processing, from bale to finished fabric. A Tatham Card fitted with a three-roller/seven-roller design is fed by a Tatham Single Automatic Feeder Model 503; this latter unit is equipped with a volumetric delivery system. A Microfeed 2000 unit is included in the line to monitor the fiber delivery from the chute section of the volumetric hopper and to speed of the card feed rollers; this compensates for any discrepancy between the pre-programmed "target" weight and the continuously monitored "actual" weight. Thus, the Microfeed unit ensures extremely accurate fiber delivery into the card unit. The web from the card is delivered from the single doffer section of the card to a Tatham conventional design crosslapper. The line is equipped with an AC Inverter-controlled drive system.

The composite substrate consists of 3 layers:
 a. Prefilter layer, which in the preferred embodiment is a Dacron nonwoven fabric;
 b. Adsorption layer, which in the preferred embodiment is an activated carbon woven fabric;
 c. Base/Next-to-skin layer, which in the preferred embodiment is a Dacron nonwoven fabric.

These 3 layers are needlepunched to develop the composite substrate at 800 strokes/min. The activated carbon fabric in the preferred embodiment is obtained from American Kynol, Inc. Based on the visual observation, the composite substrate was found to be regular and uniform. The three-layer composite is pictorially depicted in FIG. 9.
 a. Layer 1: Needlepunched layer: Double punched Dacron nonwoven (43.2 g/m$^2$).
 b. Layer 2: Middle layer: Plain weave activated carbon woven fabric (120 g/m$^2$).
 c. Layer 3: Needlepunched layer: Double punched Dacron nonwoven (43.2 g/m$^2$).

Important physical characteristics such as 1) weight, 2) tensile strength, 3) tear strength and 4) bursting strength were evaluated using standard ASTM test methods. In addition, the surface mechanical property was measured using a sliding friction apparatus.

Weight of the Composite Fabric

Table 1 gives the weight of the composite substrate.

TABLE 1

Weight of the Composite Substrate

| Sample | Weight (grams) | Area (square inches) | Weight (g/m²) |
|---|---|---|---|
| 1 | 2.065 | 4 × 4 = | Wt = 0.13205 grams/square inch |
| 2 | 2.292 | 204.678 g/m² | |
| 3 | 1.982 | | |
| 4 | 1.015 | 4 × 2 = | Wt = 0.12996 gram/square inch. |
| 5 | 1.025 | 201.438 g/m² | |
| 6 | 1.080 | | |
| 7 | 1.059 | | |
| 8 | 1.023 | | |

The average weight of the composite=203 g/m².

Tensile Strength

Figure 12A:
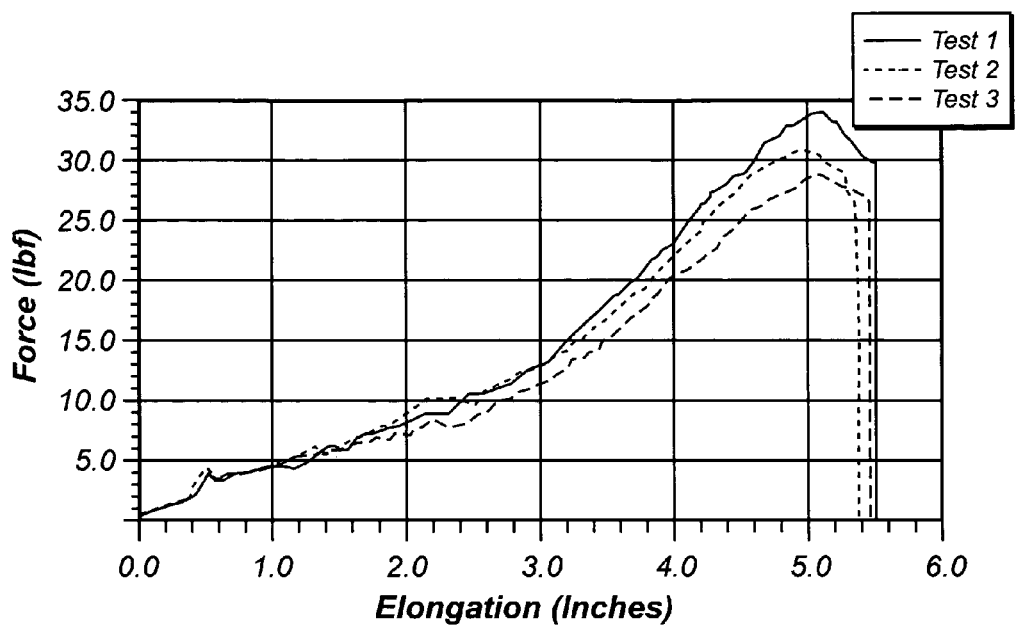
FIGS. 12A and 12B show charts of a load/elongation curves of the composite substrate of the preferred embodiment, in a cross-direction and machine-direction, respectively.
Figure 12B:
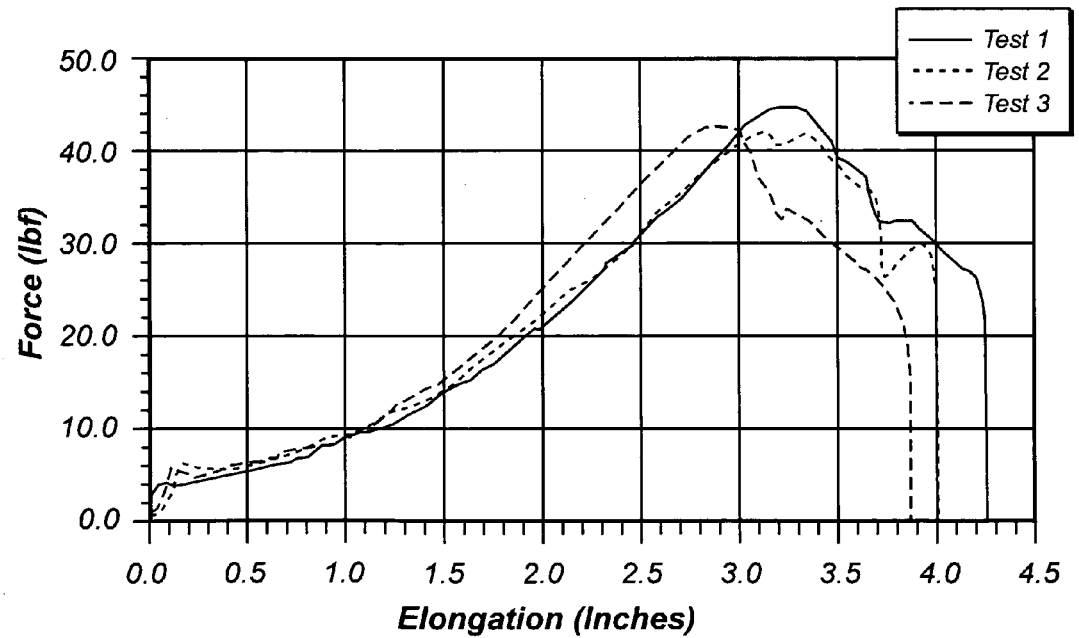

The breaking strength and the elongation of the composite substrate were measuring the "Grab" test according to the ASTM D5034 test method. The experiment was conducted in both machine and cross directions. Three repetitions were carried out in each direction. Tensile test results are given in Tables 2a and 2b. FIGS. 12A and 12B delineate the load/elongation curves for the composite fabric in cross direction and machine direction, respectively.

TABLE 2a

Tensile Strength (Cross Direction)

| | Load - Peak (lbf) | Elongation - Peak (inches) | Strain - Break (%) | Energy - Break (lbf · ft) |
|---|---|---|---|---|
| Mean | 31.232 | 4.9903 | 181.56 | 6.3834 |
| SD | 2.557 | 0.0844 | 1.71 | 0.555 |

TABLE 2b

Tensile Strength (Machine Direction)

| | Load - Peak (lbf) | Elongation - Peak (inches) | Strain - Break (%) | Energy - Break (lbf · ft) |
|---|---|---|---|---|
| Mean | 43.751 | 3.1213 | 134.3 | 7.5197 |
| SD | 1.276 | 0.192 | 6.31 | 0.5295 |

FX 3750 digital Elmendorf tearing tester was used to measure the tear strength of the composite in machine and cross directions using the ASTM D5734 test method. Three repetitions were carried out in both machine and cross directions. Tear strengths values for the composite substrate are given in Table 3.

TABLE 3

Tear Strength Values

| Direction | Repeat-1 (lbf) | Repeat-2 (lbf) | Repeat-3 (lbf) | Mean (lbf) | SD (lbf) |
|---|---|---|---|---|---|
| Machine | 11.100 | 13.500 | 11.600 | 12.067 | 1.266 |
| Cross | 9.150 | 9.440 | 9.160 | 9.250 | 0.165 |

Figure 13A:
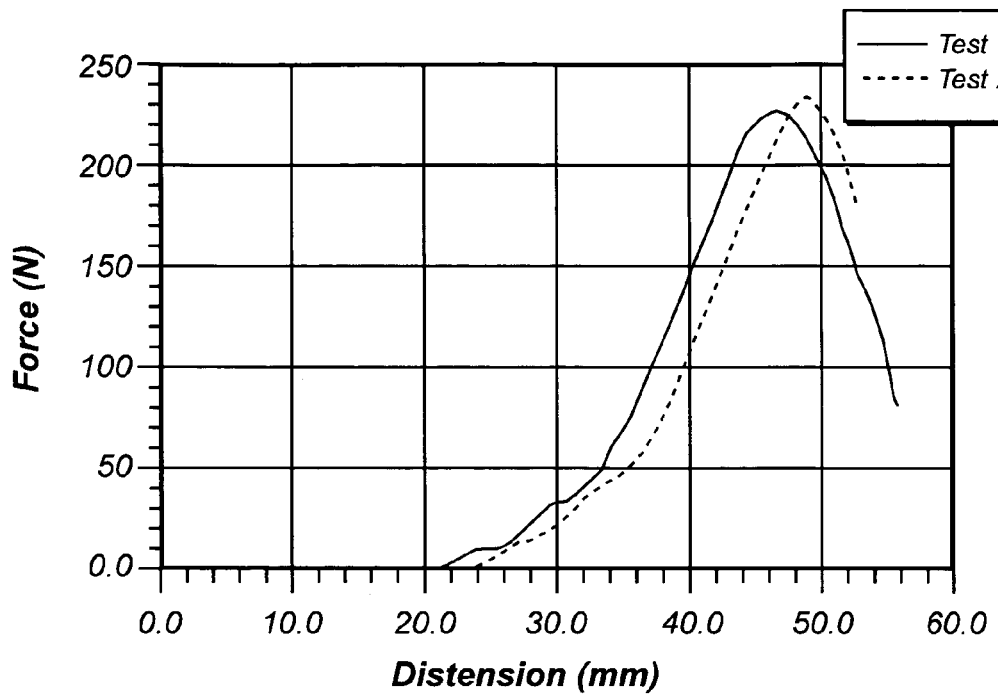
FIGS. 13A and 13B show charts of a bursting strength curves of the composite substrate of the preferred embodiment, in a machine-direction and cross-direction, respectively.
Figure 13B:
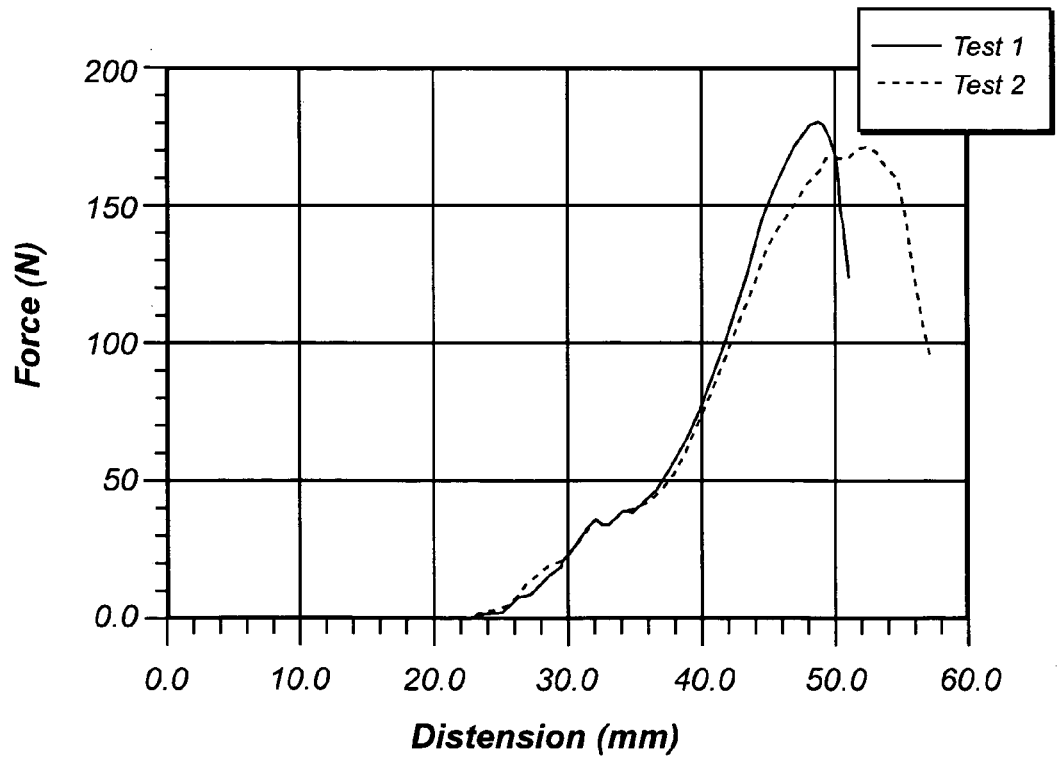

The ball burst adaptation was fitted to the SDL (CRE) tensile tester to measure the bursting strength of the composite using the ASTM D3787 test method. Two repetitions were carried out in machine and cross directions. Bursting strength results are shown in Tables 4a and 4b. FIGS. 13A and 13B delineate the bursting strength/displacement curves.

TABLE 4a

Bursting Strength Values (Machine Direction)

| | Load - Peak (Kgf) | Dist - Peak (mm) | Stress - Peak (Kgf/mm²) | Energy - Peak (Kgf · m) | Dist - Peak (mm) |
|---|---|---|---|---|---|
| Mean | 23.965 | 47.79 | 0.0019 | 225.84 | 54.99 |
| SD | 0.502 | 1.456 | 0.000 | 3.33 | 2.334 |

TABLE 4b

Bursting Strength Values (Cross Direction)

| | Load - Peak (Kgf) | Dist - Peak (mm) | Stress - Peak (Kgf/mm²) | Energy - Peak (Kgf · m) | Dist - Peak (mm) |
|---|---|---|---|---|---|
| Mean | 18.27 | 50.155 | 0.0014 | 202.80 | 54.905 |
| SD | 0.410 | 3.147 | 0.000 | 43.7 | 4.236 |

The B. C. Ames Co.'s thickness gauge was used to measure the thickness of the composite at a pressure of 3.4 psi using the ASTM D1777-60T test method. Twenty readings were taken. The thickness value was measured in one thousandth of an inch. The mean value was 41.16 (1/1000") and the SD was 1.558. The thickness of the composite fabric was 1.045 mm.

The development of the multilayer laminated composite is to improve the "next-to-skin" comfort properties of the adsorbent layers. One of the comfort properties that influence the wearers' performance and comfort is the frictional characteristics. Therefore a small study was conducted to evaluate the frictional properties of nonwoven/woven/nonwoven composite substrate.

Figure 14:
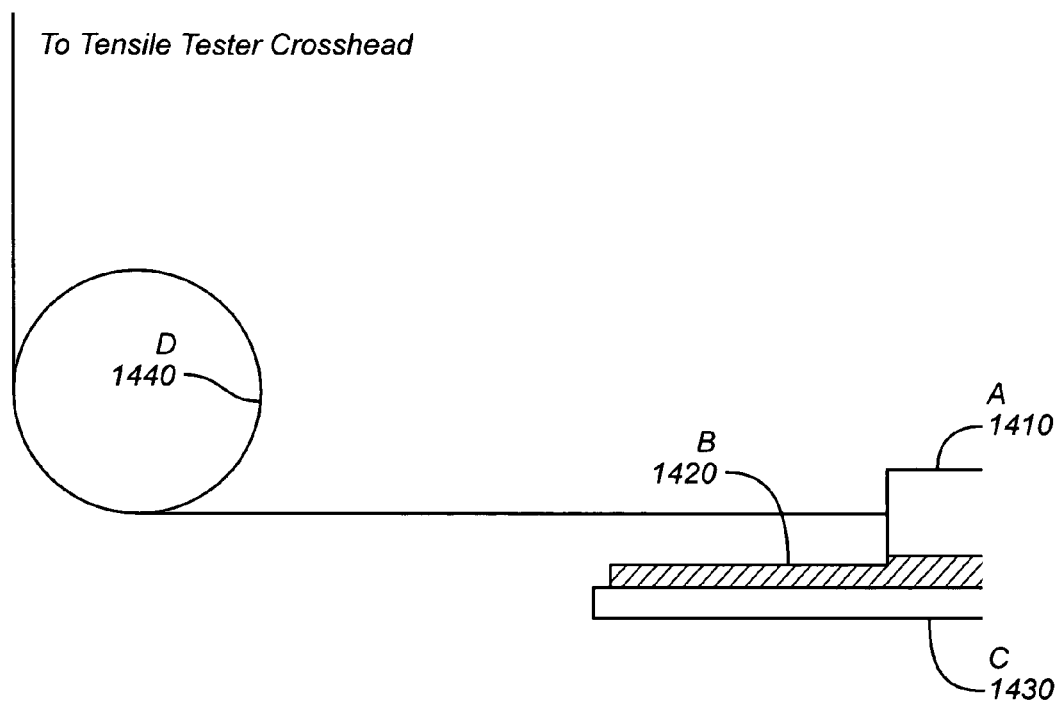
FIG. 14 shows a sliding friction apparatus used to take surface friction measurements of the preferred composite substrate.

The sliding friction adaptation as shown in FIG. 14 was used to measure the frictional properties of the CW protection substrate. A bovine leather sledge 410 was used as a standard substrate. The area of the sledge was 20 cm². The sliding friction experiment was conducted at 6 different normal loads at a sliding speed of 500 mm/min. The minimum load used was 34.66 grams and the maximum load used was 84.66 grams. The load was incremented in step of 10 grams. Three repetitions were carried out at each normal load. The average friction force value was used to calculate the friction parameters. The frictional properties were characterized using the friction parameter "C" and the friction index "n". In addition, the frictional properties were characterized using the friction factor "R" where, R=C/n.

FIG. 14 shows a sliding friction apparatus used to take surface friction measurements of the preferred composite substrate. The sliding friction apparatus includes bovine leather sledge 410, fabric 420, aluminum platform 430, and frictionless pulley 440.

TABLE 5

Frictional Properties of the Composite Substrate

| Composite Substrate | Friction Parameter "C"[Pa]$^{1-n}$ | Friction Index "n" | Friction Factor "R"[Pa]$^{1-n}$ |
|---|---|---|---|
| 5.1. Across the machine direction | | | |
| Static | 0.242 | 1.069 | 0.227 |
| Dynamic | 0.093 | 1.210 | 0.077 |

TABLE 5-continued

Frictional Properties of the Composite Substrate

| Composite Substrate | Friction Parameter "C"[Pa]$^{1-n}$ | Friction Index "n" | Friction Factor "R"[Pa]$^{1-n}$ |
|---|---|---|---|
| Average (Static + Dynamic) | 0.157 | 1.329 | 0.118 |
| 5.2 Along the machine direction | | | |
| Static | 0.0124 | 1.601 | 0.007 |
| Dynamic | 0.004 | 1.726 | 0.002 |
| Average (Static + Dynamic) | 0.008 | 1.647 | 0.049 |

FIG. 15A shows a graph of Friction Force vs. Normal Load Relationship across the machine direction. FIG. 15B shows a graph of Friction Force vs. Normal Load Relationship along the machine direction.

As is evident from FIGS. 15A and 15B, it is clear that the relationship $F/A=C(N/A)^n$ is valid for the composite fabric developed, where F is the friction force, N is the normal applied load, A is the apparent area of contact, C is the friction parameter and n is the friction index. This also shows that characterizing the frictional properties using the frictional parameters such as "C", "n" and "R" is logical.

Breathability is an important comfort factor and it affects the wearers' performance. Breathability is characterized based on water vapor transmission (WVT) through fabrics. WVT through the protective composite was measured using the standard ASTM E96 test method. This test was conducted at Texas Research Institute (TRI) Austin, Inc. ASTM E96 procedure was followed at 98 F at 50% RH. The test duration was 22 hours. The WVT transmission rate is given in Table 6.

Breathability Studies (WVT Transmission Rate)

| Repetitions | WVT (g/m$^2$/hr) |
|---|---|
| 1 | 400.45 |
| 2 | 367.44 |
| 3 | 354.52 |
| Mean | 374.137 |
| SD | 23.686 |

As is evident from the results, it is clear that the three-layered composite has allowed a good amount of water vapor to permeate through the layers indicating that composite substrate is highly breathable.

Imaging the Composite Substrate

Scanning electron micrograph of the cross section of the composite substrate was taken using Hitachi S500 SEM at a magnification level of 45. It is evident from the scanning micro-graph that the fibers in the nonwoven substrates interlock with the yarns of the woven middle layer at the interface. Furthermore, it is also clear that there is not much damage to the woven adsorbent layer due to needling process. From the micrograph, it is evident that the multiple needling does not result in breaking the nonwoven substrates and the woven intermediate layer. The needling method resulted in a well-integrated composite substrate having adequate physical properties.

In an examination of the cross section of the composite at higher magnification level (×500), it is clearly evident that the fibers from the nonwoven layers interlock with the filament layer in the composite. This results in a well-integrated composite substrate. Furthermore, it is also evident that there is no breakage of fibers or filaments in the composite due to the needling process at 800 strokes/min. Higher magnification SEM photograph helps to better understand the interlocking process more clearly at the interface and the looping of the polyester fibers with the activated carbon filament can be seen from the micrograph.

Chemical absorption studies were undertaken at TRI Environmental, Inc., Austin, Tex. and was carried out in two steps.

In the first step, a sample portion of the material approximately one inch square was cut from the original sheet of material. This material sample was placed in a Thermolyne 1300 furnace at a temperature of 350° C. for 2 hours. The purpose of this procedure was to bum away the polyester (Dacron) layer of the material as well as purify the activated charcoal. The result was a sample of the activated charcoal substrate approximately one inch square. This procedure helped to ensure a steady baseline for analysis. Furthermore, as the polyester layer does not contribute to the absorption mechanism, the removal of polyester fibers was thought not to affect the test result.

In the second step, the sample of the activated charcoal substrate was then placed into a TGA 951 gravimetric instrument. The challenge gas was 100 ppm Toluene in Nitrogen. The flow rate of the challenge gas was 100 mL/min. The test temperature varied between 25° C. and 30° C. (This temperature range allowed for temperatures that a user might expect to encounter while wearing the material). The material sample was tested for 8 hours of continuous contact with the challenge gas and the weight change of the sample was measured constantly for the length of the test. (The eight-hour time period was used to accommodate the traditional 8-hour workday).

Absorption Test Analysis

The material sample began showing absorption characteristics within 10 minutes of starting the test. The material sample gained weight throughout the 8-hour test. This is indicative of the material sample adsorbing the challenge gas. The material never reached an equilibrium rate of absorption. In addition, the material never reached a maximum absorption rate. This is indicative of the material never reaching a "saturated" state during the eight-hour time period. Therefore, it may be necessary to perform the test for a longer period of time to determine saturation value for the activated charcoal. This is indicative of the "activity" of the adsorbent layer. The fabric gained 13 micrograms/min on an average and never reached saturation during the testing period. This is the amount of Toluene adsorbed by the substrate on an average.

CONCLUSIONS

A simple and new method to develop a multilayer nonwoven/woven/nonwoven composite substrate has been elaborated in this invention. The "state-of-the-art" H1 technology needlepunching nonwoven machinery has been used to develop the composite substrate. Results to-date indicate that the composite substrate has adequate physical properties, breathability and chemical absorption capabilities.

Modifications and variations as will be recognized by those skilled in the art, the innovative concepts described in the present application can be modified and varied over a tremendous range of applications, and accordingly the scope of patented subject matter is not limited by any of the specific exemplary teachings given.

While the invention has been particularly shown and described with reference to a preferred embodiment, it will be understood by those skilled in the art that various changes in form and detail may be made therein without departing from the spirit and scope of the invention.

All references, including publications, patent applications, and patents, cited herein are hereby incorporated by reference to the same extent as if each reference were individually and specifically indicated to be incorporated by reference and were set forth in its entirety herein.

None of the description in the present application should be read as implying that any-particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC §112 unless the exact words "means for" are followed by a participle.

What is claimed is:

1. A process for making chemical protective wipes, the process comprising:
   fully needlepunching a top layer to form a needle punched coherent top layer to greater than 100 punches/cm$^2$;
   fully needlepunching a bottom layer to form a needle punched coherent bottom layer to greater than 100 punches/cm$^2$; then,
   sandwiching an adsorption layer between the coherent top layer and the coherent bottom layer to form a composite; and then,
   fully needlepunching the composite to form a multilayer composite interlocked only at the interfaces between the layers.

2. The process of claim 1, wherein the step of fully needlepunching the top layer comprises: fully needlepunching a top stack of two or more top layers to greater than 100 punches/cm$^2$; whereby the sandwiching step comprises: sandwiching an adsorption layer between the top stack and the coherent bottom layer.

3. The process of claim 2, wherein the step of fully needlepunching the bottom layer comprises: fully needlepunching a bottom stack of two or more bottom layers to greater than 100 punches/cm$^2$; whereby the sandwiching step comprises: sandwiching an adsorption layer between the top stack and the bottom stack.

4. The process of claim 3, wherein the step of fully needlepunching the top stack of two or more top layers comprises: separately fully needlepunching each of the top layers of the top stack wherein the step of fully needlepunching the bottom stack of two or more bottom layers comprises: separately fully needlepunching each of the bottom layers of the bottom stack.

5. The process of claim 3, wherein the step of fully needlepunching the top stack of two or more top layers comprises:
   stacking the two or more top layers into the top stack; and then,
   fully needlepunching the top stack to greater than 100 punches/cm$^2$;
   wherein the step of fully needlepunching the bottom stack of two or more bottom layers comprises: stacking the two or more bottom layers into the bottom stack; and then,
   fully needlepunching the bottom stack to greater than 100 punches/cm$^2$.

6. The process of claim 3, wherein the step of fully needlepunching the top stack of two or more top layers comprises: fully needlepunching the top stack of two or more top layers from above and from below; and wherein the step of fully needlepunching the bottom stack of two or more bottom layers comprises: fully needlepunching the bottom stack of two or more bottom layers from above and from below.

7. The process of claim 6, wherein the step of fully needlepunching the sandwich comprises: fully needlepunching the sandwich from above and from below.

8. The process of claim 7, wherein the sandwiching step comprises: sandwiching a plurality of adsorption layers between the top stack and the bottom stack.

9. The process of claim 8, wherein the top and bottom layers comprise fibers having denier within the range of about 1-3.

10. The process of claim 8, wherein the top and bottom layers comprise fibers having denier equal to about 1.5.

11. The process of claim 8, wherein the top and bottom layers comprise fibers having lengths within the range of about 1-3 inches.

12. The process of claim 8, wherein the top and bottom layers comprise fibers having lengths equal to about 1.5 inch.

13. The process of claim 8, wherein at least a portion of the needlepunching comprises oblique needlepunching.

14. The process of claim 8, wherein at least a portion of the needlepunching comprises straight needlepunching.

15. The process of claim 3, wherein the step of fully needlepunching the top stack of two or more top layers comprise the step of fully needlepunching from above and from below at about 50-1500 strokes per minute; and wherein the step of fully needlepunching the bottom stack of two or more bottom layers comprise the step of fully needlepunching from above and from below at about 50-1500 strokes per minute.

16. The process of claim 3, wherein the step of fully needlepunching the top stack of two or more top layers comprise the step of fully needlepunching from above and from below at about 500-750 strokes per minute; and wherein the step of fully needlepunching the bottom stack of two or more bottom layers comprise the step of fully needlepunching from above and from below at about 500-750 strokes per minute.

17. The process of claim 1, wherein each of the top and bottom layers weighs about 10-500 grams per square meter.

18. The process of claim 1, wherein each of the top and bottom layers weighs about 43.8 grams per square meter.

* * * * *

UNITED STATES PATENT AND TRADEMARK OFFICE
CERTIFICATE OF CORRECTION

| | | |
|---|---|---|
| PATENT NO. | : 7,516,525 B2 | |
| APPLICATION NO. | : 11/157124 | |
| DATED | : April 14, 2009 | |
| INVENTOR(S) | : Seshadri S. Ramkumar | |

It is certified that error appears in the above-identified patent and that said Letters Patent is hereby corrected as shown below:

Col. 2, line 38
Replace "of the present invention." with --of the present invention;--

Col. 2, line 41
Replace "of the present invention." with --of the present invention;--

Col. 2, line 44
Replace "of the present invention." with --of the present invention;--

Col. 2, line 47
Replace "of the present invention." with --of the present invention;--

Col. 2, line 50
Replace "of the present invention." with --of the present invention;--

Col. 2, line 53
Replace "of the present invention." with --of the present invention;--

Col. 2, line 56
Replace "of the present invention." with --of the present invention;--

Col. 2, line 59
Replace "of the present invention." with --of the present invention;--

Col. 3, line 8
Replace "charts of a bursting strength" with --charts of bursting strength--

UNITED STATES PATENT AND TRADEMARK OFFICE
CERTIFICATE OF CORRECTION

PATENT NO. : 7,516,525 B2
APPLICATION NO. : 11/157124
DATED : April 14, 2009
INVENTOR(S) : Seshadri S. Ramkumar It is certified that error appears in the above-identified patent and that said Letters Patent is hereby corrected as shown below:

Col. 3, line 14
Replace "substrate;" with --substrate; and--

Col. 3, line 18
Replace "direction, respectively;" with --direction, respectively.--

Col. 7, line 21
Replace "substrate were measuring the" with --substrate were measured using the--

Col. 10, line 13
Replace "at a temperature of 350°C. for 2 hours" with --at a temperature of 350°C for 2 hours--

Col. 10, line 14
Replace "this procedure was to bum away" with --this procedure was to burn away--

Col. 10, line 26
Replace "varied between 25°C. and 30°C." with --varied between 25°C and 30°C--

Signed and Sealed this

Second Day of June, 2009

JOHN DOLL
*Acting Director of the United States Patent and Trademark Office*